Dec. 21, 1965   J. F. PETERSEN   3,225,222
CONTROL APPARATUS
Filed Dec. 6, 1960                2 Sheets-Sheet 1

FIG. I

INVENTOR.
JOHN F. PETERSEN
BY Roger W. Jensen
ATTORNEY

Dec. 21, 1965     J. F. PETERSEN     3,225,222
CONTROL APPARATUS

Filed Dec. 6, 1960     2 Sheets-Sheet 2

INVENTOR.
JOHN F. PETERSEN
BY Roger W. Jensen
ATTORNEY

United States Patent Office 3,225,222
Patented Dec. 21, 1965

3,225,222
CONTROL APPARATUS
John F. Petersen, New Brighton, Minn., assignor to Honeywell Inc., a corporation of Delaware
Filed Dec. 6, 1960, Ser. No. 74,108
10 Claims. (Cl. 307—101)

This invention relates to apparatus for reducing hysteresis in an impedance such as in an inductance with an iron core and more specifically to apparatus for reducing hysteresis by means of a damped sine wave.

Hysteresis has always been a problem in inductive devices having magnetic cores. Many solutions to this problem have been proposed. One of the older methods of reducing hysteresis is a method known as "A.-C. dither." This consists of merely applying an A.-C. voltage to the core winding until the stored energy from the last applied signal or activating voltage is dissipated. However, this method is unsatisfactory in modern inductance devices because of the accuracy that is necessary. For example if a signal is applied to the torquer of a gyro in a guidance platform the hysteresis in the core of the torquer can cause a torquing rate uncertainty of 45 degrees per hour. By the old A.-C. dither method this error can practically be reduced to 25 degrees per hour, which is still too high. A large hysteresis error is left in the core after A.-C. dither because the amplitude of the A.-C. signal applied to the torquer winding cannot, for practical reasons, be as high as would be necessary to remove all of the hysteresis.

If a damped A.-C. signal is applied to a winding the signal will end on zero and the average voltage of the applied signal will be zero. This method reduces the error due to hysteresis to 2 or 3 degrees per hour or less. However, before this method was adopted for use, especially in such applications as the torquers of gyros in guidance systems, many problems had to be eliminated. The foremost problem was the use of high voltage. In general, the energy stored in the circuit producing the damped A.-C. signal must be larger than the residual hysteresis effects after the maximum allowable torquing signal has been applied to the torquer winding of the gyro. In prior art arrangements this meant a very high energizing or supply voltage for the circuit. In many applications a high voltage power supply is not practical. For example, if the hysteresis reducing apparatus were to be used to reduce hysteresis in the torquers of gyros in a guidance system a high voltage supply could not be used because high voltages have a great tendency to arc at high altitudes. Also in most guidance systems the use of transistors rather than vacuum tubes is mandatory since vacuum tubes will not withstand the high accelerations which are prevalent. Transistors, which could withstand high voltages necessary for sufficient hysteresis reduction, have not, as yet, been produced.

The present invention completely eliminates all of these problems by using a standard low voltage missile power supply to power a transistorized circuit which produces a damped oscillatory wave with energy in excess of the hysteresis effect caused by maximum torquing of the gyro.

It is a primary object of this invention to provide an improved control apparatus.

It is a further object of this invention to provide a useful hysteresis reducing apparatus.

It is a further object of this invention to provide a hysteresis reducing apparatus that is applicable to missile guidance system.

Still a further object of this invention is to provide a hysteresis reducing apparatus than can be energized by a low voltage supply.

These and other objects of this invention will become apparent from the following description of a preferred form thereof and the accompanying specification, claims, and drawings, of which:

Figure 1:
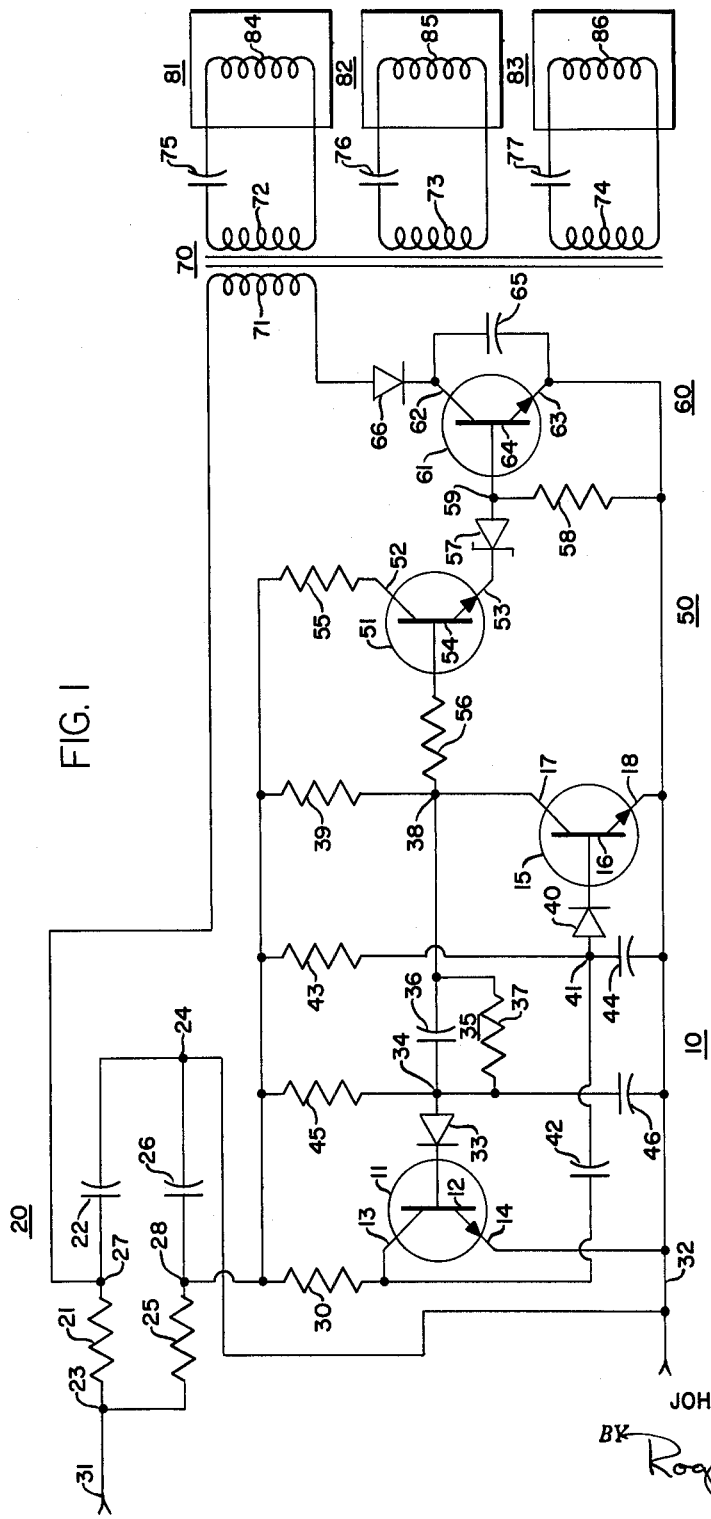
FIGURE 1 is a schematic diagram of the hysteresis reducing apparatus.

Referring to the drawing, the reference numeral 10 designates a free running multivibrator comprising two transistors 11 and 15 and their associated circuitry. Transistor 11 has a base 12, a collector 13, and an emitter 14. Transistor 15 has a base 16, a collector 17, and an emitter 18. A decoupling network 20 is provided and comprises a series connected resistor 21 and capacitor 22 connected between a pair of junction points 23 and 24. The network further includes a series connected resistor 25 and a capacitor 26 also connected between the junction points 23 and 24. The capacitors 22 and 26 are adjacent to junction point 24 while the resistors 21 and 25 are adjacent to junction point 23. The junction between resistor 21 and capacitor 22 is identified by reference numeral 27 while the junction between resistor 25 and capacitor 26 is identified by reference numeral 28.

The collector 13 of transistor 11 is connected to junction 28 of the decoupling network 20 through a resistor 30. The decoupling network 20 is adapted to be connected to a voltage supply (not shown) by means of a lead 31 connected to junction point 23 thereof. Lead 31 may be considered to have applied thereto a positive voltage. The emitter 14 of transistor 11 is adapted to be connected to the negative or grounded side of the voltage supply (not shown) through a lead 32.

One side of a diode 33 is connected to base 12 of transistor 11. The other side of the diode is connected to a junction point 34. A parallel RC coupling network 35 comprising a capacitor 36 connected in parallel with a resistor 37 is connected at one end to junction point 34 and its other end to junction point 38 which is connected to collector 17 of transistor 15.

Junction point 38 is connected to junction point 28 of decoupling network 20 by means of resistor 39. One side of a diode 40 is connected to base 16 of transistor 15, and the other side is connected to a junction point 41. Junction point 41 is connected by way of capacitor 42 to collector 13 of transistor 11. Junction point 41 also connects to junction point 28 of decoupling network 20 by means of a resistor 43. A capacitor 44 is connected between the negative side of the supply and junction point 41. Resistor 43 and capacitor 44 form a bias network for transistor 15. These components maintain junction point 41 at a high enough positive voltage to allow transistor 15 to conduct base current through diode 40 at all times except as will be explained later, when capacitor 42 is charging. Junction point 34 is connected to junction point 28 by means of a resistor 45. Capacitor 46, which is connected to ground by lead 32 on one side, is connected to junction point 34 on the other side. Resistor 45 and capacitor 46 form a bias network for transistor 11. These components insure a positive voltage at junction point 34 at all times except when a negative voltage is applied by means of capacitor 36 discharging through resistor 37.

A one stage current amplifier numerically designated 50 in FIGURE 1 comprises a transistor 51 and its associated circuitry. Transistor 51 has a collector 52, an emitter 53 and a base 54. The collector 52 of transistor 51 is connected to junction point 28 of decoupling network 20 by means of a resistor 55. The base 54 of transistor 51 is connected to junction point 38 by means of a resistor 56. A Zener diode numerically designated 57 is connected at one end to emitter 53 of transistor 51, and the other end is connected to ground lead 32 by means of a resistor 58.

Number 60 numerically designate a switching circuit comprising a transistor 61 and its associated circuitry. Transistor 61 has a collector 62, an emitter 63, and a base 64. Emitter 63 of transistor 61 is connected to ground by means of lead 32. An energy storing means is provided and, as shown, takes the form of a transformer 70, which in this preferred embodiment has a primary winding 71 and three secondary windings numerically designated 72, 73, and 74. Collector 62 of transistor 61 is connected to junction point 27 of decoupling network 20 by means of a diode 66 connected in series with the primary 71 of transformer 70. The base 64 of transistor 61 is connected to the junction of Zener diode 57 and resistor 58, designated numerically as 59. A capacitor 65, used as a protection means, is connected between collector 62 and emitter 63 of transistor 61.

In its preferred embodiment this device will be used to reduce hysteresis in the torquer windings of torquers of gyros. Thus in FIGURE 1 three loads are shown. Numbers 81, 82, and 83 represent floated gyros which well may be the type shown in Jarosh et al. Patent 2,752,791. Reference numeral 84 schematically represents a torquer winding of floated gyro 81. One end of torquer winding 84 is connected to one side of a capacitor 75. The other end of winding 84 is connected to one end of winding 72 of transformer 70. The other side of capacitor 75 is connected to the other end of secondary winding 72. Thus secondary winding 72, capacitor 75, and torquer winding 84 of floated gyro 81 form a tuned LC tank circuit. Reference numeral 85 represents a torquer winding for floated gyro 82. Reference numeral 86 represents a torquer winding for floated gyro 83. In the same manner as the first mentioned tuned LC tank circuit, torquer windings 85 is connected in series with a capacitor 76, and capacitor 76 and torquer winding 85 are connected across secondary winding 73 of transformer 70. Thus secondary winding 73, capacitor 76, and torquer winding 85 form a second tuned LC tank circuit. Also, torquer winding 86, a capacitor 77 and secondary winding 74 form a third tuned LC tank circuit.

*Operation*

Assume that transistor 11 of the free-running multivibrator 10 starts conducting when the circuit is energized. As transistor 11 conducts it draws base current which will come from the voltage supply through lead 31 to junction 23, through resistor 25 to junction 28, through resistor 45 and diode 33. It should be noted that current will also flow through a parallel network consisting of resistor 39 and RC coupling network 35. This parallel network will conduct until capacitor 36 of RC network 35 becomes charged to some value near the supply voltage. As the conduction of transistor 11 increases the voltage at the collector 13 of transistor 11 will begin to drop with respect to ground lead 32. As this voltage begins to drop a current will flow from the voltage supply through lead 31, resistor 25, resistor 43, capacitor 42, and transistor 11 from collector 13 to emitter 14 and back to the voltage supply by means of lead 32. Thus, because of the current flowing through resistor 43 the voltage at junction point 41 is a low voltage near ground potential. This causes diode 40 to be back biased, or in other words, diode 40 will not conduct current. As capacitor 42 charges, the current through resistor 43 begins to decrease and therefore the voltage at junction point 41 begins to rise. When this voltage reaches some value high enough to forward bias diode 40, base current will be allowed to flow into the base 16 of transistor 15. This base current will cause transistor 15 to conduct. As transistor 15 begins to conduct the voltage at junction point 38 tends to look like a negative going voltage. Because the voltage at junction point 38 is now of some value slightly greater than zero capacitor 36 begins to discharge through parallel resistor 37. This discharge causes junction point 34 to become some negative value. Thus diode 33 is back-biased so that it can no longer conduct base current for the base 12 of transistor 11, which causes transistor 11 to cut off. As transistor 15 conducts capacitor 42 will discharge through diode 40, base 16 to emitter 18 of transistor 15, to ground lead 32, through the supply to lead 31, resistor 25, resistor 30, and back to the other side of capacitor 42. Transistor 15 will conduct until capacitor 36 has discharged through parallel resistor 37 sufficiently far to raise the voltage at junction point 34 enough to allow diode 33 to conduct base current. As diode 33 again begins to conduct base current into base 12 of transistor 11, transistor 11 begins to conduct. When transistor 11 begins to conduct the cycle is again repeated as before. It should be understood that capacitor 36 has a fairly large resistor 37 to discharge through, while capacitor 42 has practically no resistance in diode 40 and base 16 to emitter 18 of transistor 15 to discharge through. Thus, because the discharge time of capacitor 36 determines the amount of time which transistor 15 will conduct, and transistor 11 will be cut off, it can be seen that transistor 15 will conduct the larger portion of the time. This can be observed more clearly by referring to FIGURE 2.

Figure 2:
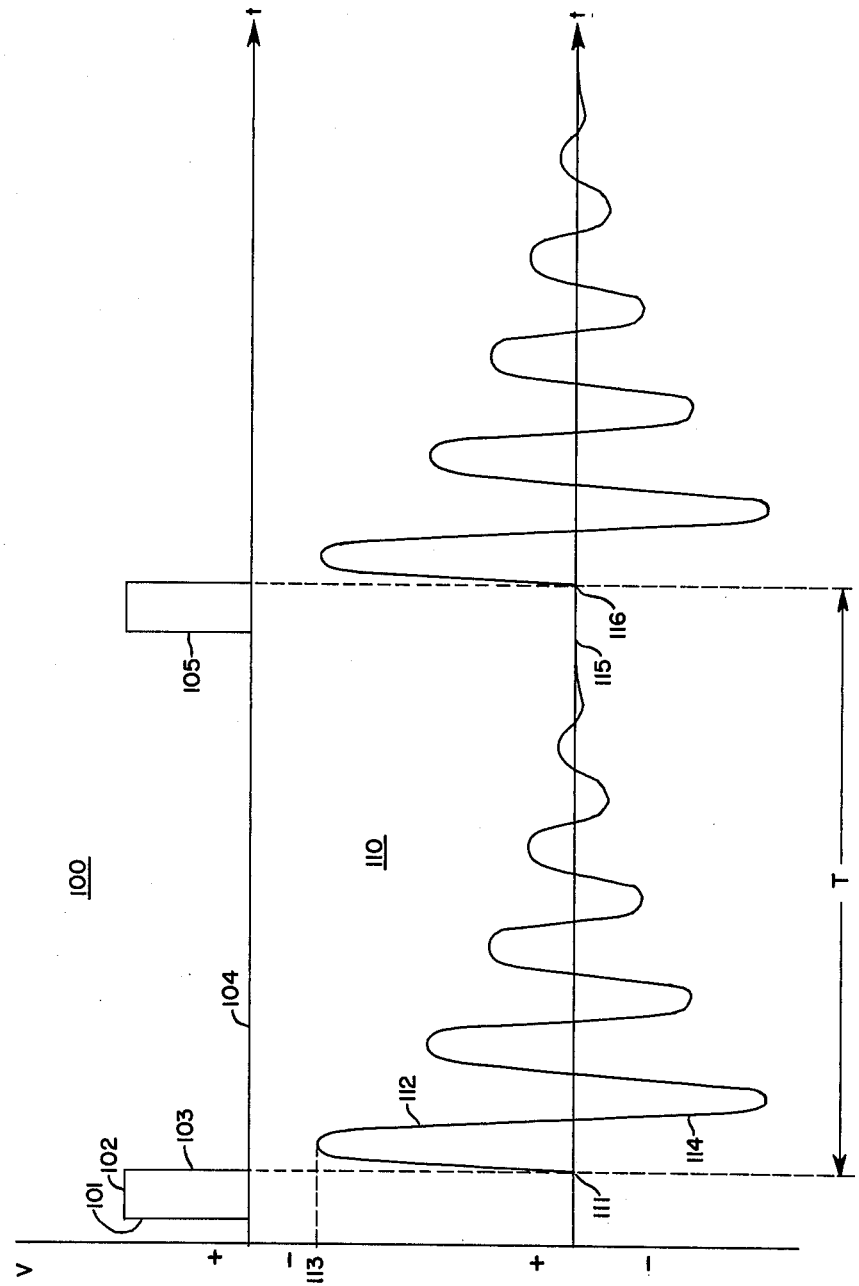
FIGURE 2 is a diagram of two of the voltage wave forms present within the apparatus.

In FIGURE 2 numeral 100 designates the voltage wave form which would be observed at junction point 38. The horizontal line designated $t$ depicts time elapsed. The vertical line designated $v$ depicts voltage. It should be noticed that the voltage is positive above the horizontal line $t$ and negative below the horizontal line $t$. Numeral 101 denotes the voltage on junction point 38 at the instant when transistor 15 is cut off and transistor 11 begins conducting. Numeral 102 denotes the voltage at the junction point 38 during the time which transistor 11 is conducting in saturation and transistor 15 is cut off. Numeral 103 denotes the voltage dropped at junction point 38 during the time when transistor 15 is turning on and transistor 11 is cutting off. The time elapsed during which transistor 15 is conducting and transistor 11 is cut off is denoted by numeral 104 and it should be noted that at this time the voltage of junction point 38 is approximately zero. This is due to the fact that transistor 15 is conducting in saturation. The start of a new cycle is designated 105. A complete period is measured in time and may be from the end of one pulse in wave form 100 to the end of the next one as shown by the letter T, or it may be measured from any point on one pulse to the same point on the next pulse.

Wave form 100 is then amplified by current amplifier 50. This is done by impressing the wave form 100 on base 54 of transistor 51 by means of resistor 56. As the positive pulses of wave form 100 appear on the base 54 of transistor 51, transistor 51 conducts current from the voltage supply by means of lead 31, resistor 25, resistor 55, from collector 52 to emitter 53 of transistor 51, Zener diode 57, resistor 58, and back to the negative side of the supply by means of lead 32. Zener diode 57, because of the constant voltage drop across it in the on condition, insures that the voltage at the emitter 53 of transistor 51 is always a high enough value that only the positive pulses at junction 38 can turn transistor 51 on. It should be noted that the wave form at the junction 59 is essentially the same as wave form 100. However, this wave form will have a higher value of current than wave form 100.

As the wave form on junction 59 goes positive base 64 of transistor 61 draws base current. This base current causes transistor 61 to turn on allowing current to flow from the supply by means of lead 31, resistor 21, primary winding 71 of transformer 70, diode 66, from collector 62 to emitter 63 of transistor 61, and back to the negative side of the voltage supply by means of lead 32. This flow of current through the primary winding 71 of transformer 70 causes a large amount of energy to be stored in transformer 70 by means of the field which builds up. Since this field builds up very quickly transistor 61 only needs to conduct for a short time. Thus, if the time, which wave form 100 is at a value of voltage indicated by 102, is short, transistor 61 will consume a small amount of power. Once the wave form at junction point 59 drops, which could be the same as the drop denoted by numeral 103 in FIGURE 2, transistor 61 no longer can conduct base current into its base 64. Thus, transistor 61 cuts off sharply. This sharp cut off tends to stop the current flow through primary winding 71 of transformer 70 causing the field which has built up in transformer 70 to collapse. This collapsing field induces a large step of current into secondary winding 72, secondary winding 73, and secondary winding 74 of transformer 70. It also induces a large step of voltage into primary winding 71 which tends to keep current flowing through diode 66. However, since this current can no longer flow through transistor 61 it is absorbed by capacitor 65, which is across transistor 61 from collector 62 to emitter 63 as a protection against this large step of current. Capacitor 65 could be replaced by any protection means such as a diode or a spark gap. Diode 66 could also be replaced by any diode means which would allow the current to flow in only the downward, or in other words, from the primary 71 to transistor 61, direction. Also, as will be explained later, a large negative voltage will be induced from the secondary windings of transformer 70 to the primary winding 71 causing a large negative voltage to be impressed across diode 66 and transistor 61. This large negative voltage could destroy transistor 61 by causing a large flow of current from collector 62 to base 64 if some means of stopping this current were not present. The means of stopping this current is diode 66 which is back biased at this time and, thus, allows no current to flow.

Switching circuit 60 is a means of stopping the current flow through transformer 70, sharply, to cause a large step of current. Also free running multivibrator 10 and current amplifier 50 are a combination of means to activate switching means 60. It should be noted that any fast switching means and any means to activate that switching means could be used.

As the large step of current is induced into the secondary windings of transformer 70 the three parallel tank circuits will tend to oscillate. For convenience one tank circuit will be explained and the rest must be assumed to operate in the same manner.

Looking at FIGURE 2 numeral 110 designates the wave form which would be seen across the torquer winding 84 of floated gyro 81. As in the other wave form the horizontal line designated t shows time elapsed and the vertical line designated v shows positive voltage above the horizontal line t and negative voltage below the horizontal line t. Number 111 designates the time at which switching means 60 cuts off sharply and the pulse of current begins to build up in the secondary winding 72 of transformer 70. The first pulse of current which builds up causes a pulse of voltage, designated 112 in waveform 110, across the tuned LC tank circuit comprised of secondary winding 72, capacitor 75, and torquer winding 84. It can be seen that this pulse will build up to some value of voltage numerically shown as 113. For convenience, this voltage has not been shown with the same value of voltage along reference axis v as wave form 100, since it is much larger. The initial pulse of current will charge capacitor 75 to the value of voltage designated by 113. Once the capacitor 75 is charged to the value of voltage 113, current will cease. At this time capacitor 75 will begin to discharge causing current to flow in the other direction through secondary winding 72 and torquer winding 84 giving a value of voltage across the torquer winding 84 shown as the portion of the wave form 114. It will be noticed that this negative portion of the wave form is slightly smaller than portion 113. This is due to the inherent resistance of the tank circuit. Negative portion 114 of wave form 110 will induce a negative voltage into primary winding 71 of transformer 70 causing the negative voltage mentioned before. This negative voltage will be dropped across diode 66. As capacitor 75 charges, discharges and recharges in the opposite direction more energy is lost in the resistance of the tank circuit. The peak value to which capacitor 75 charges will continually decrease until all of the energy induced into the tank circuit by the original pulse of energy is dissipated. Thus, the wave shape shown in 110 will appear across torquer winding 84. This wave shape will extend to time 115, at which time, or some time thereafter, the switching means 60 will again begin to conduct. This is shown as time 105 in wave form 100. At time 116 switching means 60 again cuts off sharply and another damped oscillation begins. It should be noted that one oscillation is completely damped out before the next oscillation begins.

The frequency of the resonant circuit is tuned sufficiently high, by choosing the proper value of capacitor 75, that these damped oscillations 110 do not have an effect upon the operation of the impedance in which the hysteresis is being eliminated. In this preferred embodiment the torquer winding 84 of a floated gyro 81 is being used as the impedance. Thus, the frequency is tuned above the reaction time of the torquer in the floated gyro 81 so that the damped oscillations are too fast to allow the torquer to react, and when a torquing signal is applied to the winding 84 of the torquer it torques the gyro in exactly the same manner as if no damped oscillations are applied. However, as soon as the torquing signal is removed the next damped oscillation eliminates substantially all of the hysteresis from the core of the torquer.

Thus, the invention uses a single low voltage power supply to energize a pulse producing network and to actually produce a high voltage damped oscillation which effectively reduces hysteresis in the magnetic core of an induction device to a value that makes this invention useful in the torquers of gyros in guidance systems. It should be noted that all high voltages are restricted to the secondary circuits of transformer 70. This is a very important feature in designing this apparatus for use in such things as guidance systems. Also, through unique circuit design, standard transistors are used and the cost of production has been greatly reduced.

What has been described is considered to be the preferred embodiment of this invention, but it should be understood that various changes and modifications thereof may be made without departing from the spirit or scope of the invention as defined in the appended claims.

What I claim is:

1. Apparatus comprising: a transformer having a primary and at least one tuned secondary, said secondary being characterized by oscillating when electrically pulsed; diode means; switching means; means adapted to be connected to an energizing source; means connecting the primary of said transformer, said diode means and said switching means in series with said adaptive means; control means for producing an oscillatory signal, said signal having a period slightly longer than the duration of the oscillations of said tuned secondary of said transformer; and means connecting said control means to said switching means.

2. Apparatus comprising: a transformer having a primary and at least one tuned secondary, said secondary being characterized by oscillating when pulsed electrically; diode means; gating means; means adapted to be connected to an energizing source; means connecting the primary of said transformer, said diode means, and said gating means in series with said adaptive means; pulse producing means, the pulses of said pulse producing means having a period slightly longer than the duration of the oscillations of the tuned secondary of said transformer; an amplifier means; means connecting said pulse producing means to said amplifier means and said amplifier means to said gating means; and means connecting said pulse producing means and said amplifier means across said adaptive means.

3. Apparatus comprising: a transformer having a primary and at least one tuned secondary, said secondary being characterized by oscillating when electrically pulsed; diode means; switching means; means adapted to be connected to an energizing source; means connecting the primary of said transformer, said diode means, and said switching means in series with said adaptive means; high voltage protection means; means to connect said high voltage protection means across said switching means; control means, said control means having a controlling period slightly longer than the duration of the oscillations of the tuned secondary of said transformer; and means connecting said control means to said switching means.

4. Hysteresis reducing apparatus comprising: a transformer having a primary and at least one secondary; tuning means; an impedance; means connecting the secondary of said transformer and said tuning means in series with said impedance; said secondary of said transformer, said tuning means and said impedance in series being characterized by oscillating when pulsed electrically; diode means; switching means; means adapted to be connected to an energizing source; means connecting the primary of said transformer, said diode means and said switching means in series with said adaptive means; control means, said control means being characterized by producing electrical pulses, said electrical pulses having a period slightly longer than the duration of oscillations of the secondary of said transformer, said tuning means and said impedance connected in series; and means connecting said control means to said switching means.

5. Torquer hysteresis reducing apparatus comprising: a transformer having a primary and at least one tuned secondary; a torquer winding; means connecting the tuned secondary of said transformer across said torquer winding, said tuned secondary and said torquer winding connected in parallel being characterized by producing oscillations when electrically pulsed; diode means; switching means; means adapted to be connected to an energizing source; means connecting the primary of said transformer; said diode means and said switching means in series across said adaptive means; control means being characterized by producing electrical pulses, said electrical pulses having a period slightly longer than the duration of the oscillations of said tuned secondary connected across said torquer winding; and means connecting said control means to said switching means.

6. Torquer hysteresis reducing apparatus comprising: a transformer having a primary and at least one secondary winding; tuning means; torquer winding means; means connecting the secondary winding of said transformer and said tuning means in series with said torquer winding means; said secondary winding, said tuning means and said torquer winding means in series being characterized by producing oscillations when electrically pulsed; diode means; switching means; means adapted to be conected to an energizing source; means connecting the primary of said transformer, said diode means and said switching means in series across said adaptive means; high voltage protection means; means connecting said protection means across said switching means; control means, said control means having a controlling period slightly longer than the duration of the oscillations of the secondary of said transformer, said tuning means and said torquer winding means in series; and means connecting said control means to said switching means.

7. Apparatus comprising: a transformer having a primary and a secondary; means including inductance means connected to said secondary, said connected means and said secondary constituting a tuned circuit characterized by oscillating when electrically pulsed and said tuned circuit including damping means for damping out oscillations thereof within a first period of time; terminal means adapted to be connected to a voltage source; switching means controllable to a conducting condition and to a nonconducting condition; means connecting said primary, said switching means, and said terminal means; and means controlling said switching means so that said switching means is normally in its nonconducting state and so that at time intervals at least as long as said first period of time said switching means is controlled to its conducting state for a period of time substantially shorter than said first period of time.

8. Apparatus comprising: a transformer having a primary and a secondary; means including inductance means connected to said secondary, said connected means and said secondary constituting a tuned circuit characterized by oscillating when electrically pulsed and said tuned circuit including damping means for damping oscillations thereof within a first period of time; terminal means adapted to be connected to a voltage source; switching means controllable to a conducting condition and to a nonconducting condition; means connecting said primary, said switching means, and said terminal means so that when said switching means is controlled to its conducting condition current is permitted to flow in said primary; and means controlling said switching means so that said switching means is normally in its nonconducting state and so that at time intervals at least as long as said first period of time said switching means is controlled to its conducting state for a period of time substantially shorter than said first period of time.

9. Apparatus comprising: a transformer having a primary and a secondary; gyroscopic means including inductance means; means including said inductance means connected to said secondary, said connected means and said secondary constituting a tuned circuit characterized by oscillating when electrically pulsed and said tuned circuit including damping means for substantially damping out oscillations thereof within a first period of time; terminal means adapted to be connected to a voltage source; switching means controllable to a conducting condition and to a nonconducting condition; means connecting said primary, said switching means, and said terminal means; and means controlling said switching means so that said switching means is normally in its nonconducting state and so that at time intervals at least as long as said first period of time said switching means is controlled to its conducting state for a period of time substantially shorter than said first period of time.

10. Apparatus comprising: a transformer having a primary and a secondary; means including inductance means connected to said secondary, said connected means and said secondary constituting a tuned circuit characterized by oscillating when electrically pulsed and said tuned circuit including damping means for substantially damping out oscillations thereof within a first period of time; terminal means adapted to be connected to a voltage source; current control means; means connecting said primary, said current control means and said terminal means so that current flow in said primary is controlled by said current control means; and means controlling said current control means so that said current flow in said primary is normally prevented and so that at time intervals at least as long as said first period of time current flow in said primary is permitted.

References Cited by the Examiner

UNITED STATES PATENTS

| | | | |
|---|---|---|---|
| 1,650,910 | 11/1927 | Rubenberg | 307—101 |
| 2,279,228 | 4/1942 | Evans et al. | 307—101 X |
| 2,337,253 | 12/1943 | Lamm | 307—101 |
| 2,898,408 | 8/1958 | Folse | 317—157.5 |
| 3,093,774 | 6/1963 | Christianson et al. | 317—157 |

ORIS L. RADER, *Primary Examiner.*

LLOYD McCOLLUM, *Examiner.*